United States Patent [19]

Caster et al.

[11] Patent Number: 4,865,758
[45] Date of Patent: Sep. 12, 1989

[54] PAINT REMOVING COMPOSITION CONTAINING LOWER ALKYL-SUBSTITUTED 2-OXAZOLIDINONES

[75] Inventors: Kenneth C. Caster, Hurricane; Ronald L. Readshaw, Charleston, both of W. Va.

[73] Assignee: Union Carbide Corporation, Danbury, Conn.

[21] Appl. No.: 270,446

[22] Filed: Nov. 8, 1988

Related U.S. Application Data

[63] Continuation of Ser. No. 176,218, Mar. 31, 1988, abandoned.

[51] Int. Cl.$^4$ .................. C11D 7/50; C11D 7/32; C11D 7/60
[52] U.S. Cl. ..................... 252/171; 252/162; 252/DIG. 8
[58] Field of Search ................. 252/162, 171, DIG. 8

[56] References Cited

U.S. PATENT DOCUMENTS

| 2,399,188 | 4/1946 | Homeyer | 260/307 |
| 2,755,286 | 7/1956 | Bell, Jr. et al. | 260/307 |
| 4,120,810 | 10/1978 | Palmer | 252/153 |

FOREIGN PATENT DOCUMENTS

| 0244810 | 11/1987 | European Pat. Off. |
| 0097967 | 5/1985 | Japan |
| 0136574 | 6/1986 | Japan |
| 0023704 | 2/1988 | Japan |

Primary Examiner—Paul Lieberman
Assistant Examiner—Kathleen Markowski
Attorney, Agent, or Firm—Norman L. Balmer

[57] ABSTRACT

A paint removing composition comprising lower alkyl-substituted 2-oxazolidinones is disclosed. Also disclosed are methods for softening and removing paint which has been applied to a substrate comprising contacting a painted substrate with the above-described paint remover composition.

16 Claims, No Drawings

PAINT REMOVING COMPOSITION CONTAINING LOWER ALKYL-SUBSTITUTED 2-OXAZOLIDINONES

This application is a continuation of prior U.S. application Ser. No. 176,218 filed Mar. 31, 1988 abandoned.

FIELD OF THE INVENTION

This invention relates to paint removing compositions with improved safety characteristics and more particularly to paint removing compositions containing lower alkyl-substituted 2-oxazolidinones.

BACKGROUND OF THE INVENTION

The term "paint" as hereafter applied refers to coatings such as enamel, latex, lacquer, varnish, shellac and polyurethane finishes used to protect and/or beautify substrates. If applied by wiping, a paint remover can also serve to "degloss" an applied finish so that it will be suitably prepared for application of a new coat of paint. When used on brushes or other coatings applicators, some paint removers can also remove hardened paint from the brush or applicator thereby restoring it to useable condition. As used herein, the term "paint remover" refers to compositions which can strip or facilitate the stripping of "paint" from a substrate to which it is applied.

Chemical paint removers have achieved considerable popularity because they are much easier to use than the non-chemical alternatives, such as blow torches and power sanders. These chemical paint removers fall into two basic categories. One category is a caustic-based remover which is seldom used in home applications because it requires heating and the use of dip tanks. These caustic based removers also have a deleterious effect on many kinds of wood, and often dissolve the glue holding the furniture together.

The second category of paint removers, which also is the more popular type, contains an organic chemical solvent base. A typical composition of such a paint remover is disclosed in U.S. Pat. No. 2,507,983. This patent discloses a paint remover containing methylene chloride (85% by weight of the mixture) as the active compound with methanol and methycellulose being added as a thickener. Paint removers such as these containing methylene chloride are generally very effective in removing varnish and alkyd paint. They are less effective on lacquer and latex finishes. Unthickened removers which have high concentrations of methanol and benzene are often used for varnish removal.

However, most known varnish and paint removers suffer from serious performance defects. They evaporate so rapidly that the surface tends to dry out before the finish is sufficiently softened to allow for its easy removal. Methylene chloride, for example, has a vapor pressure so high (400 mm Hg at 75° F.) that it evaporates very rapidly. Typically, as mentioned in U.S. Pat. No. 2,507,983, wax is added to form a vapor barrier to retard its evaporation. However, after such waxy compositions are applied, cross brushing of the paint remover or testing of the surface must be avoided or the barrier film will crack and permit the solvent to evaporate and escape. The wax itself is also regarded as a serious handicap by furniture refinishers because it must be removed completely before applying the new finish.

The most serious objection to these prior art paint removers is their high degree of toxicity. (See for examples Consumer Reports, March, 1972, p. 147.)

A thorough literature study on methylene chloride toxicity in particular confirms that it is extremely hazardous. The primary avenue of contact is by vapor inhalation, due in large measure to its very high vapor pressure. It has been shown that even with moderate ventilation, methylene chloride levels can rise to 1200 ppm in the breathing zone of a person using this material to strip paint. With less ventilation, as is commonly encountered in home use, levels rise much higher. In addition, methylene chloride is metabolized to carbon monoxide, the presence of which places stress on the cardiovascular system and can cause heart attacks and death. Literature dealing with this subject includes Richard D. Stewart, et al, *The Journal of the American Medical Association*, Volume 235 (4), Page 398, Jan. 26, 1976, and R. S. Ratney, et al, *Archives of Environmental Health*, Volume 28 (8), Pages 223–6, 1974.

Prolonged exposure to methylene chloride also depresses the activity of the nervous system, decreasing alertness and disturbing sleep patterns. (G. G. Fodor, and H. Winneke, *Proceedings International Clean Air Congress*, 2nd, 238–43, 1970.) The body's ability to respond to stress therefore is decreased, thereby compounding the problem associated with metabolism of the methylene chloride to carbon monoxide. Repeated exposure to methylene chloride has also been shown to result in digestive disorders and liver damage. (C. C. Haun, et al, *U.S. National Technical Information Service*, AD Report, 1971 #751432).

Another objection to paint removers containing methylene chloride is that they can burn the skin, producing varying degrees of dermatitis depending upon the duration of contact with the skin.

Methanol is also commonly used in paint strippers. If used with methylene chloride as it often is, it prolongs the period of cardiovascular stress caused by the methylene chloride. Furthermore, it is also toxic in its own right. According to N. Irving Sax, *Dangerous Properties of Industrial Materials*, Van Nostrand Co., NY, 1968, at page 911, methanol should be regarded as a cumulative poison because of the slowness with which it is eliminated from the human body. Severe exposure to methanol is said to cause dizziness, unconsciousness, irregular respiration, cardiac depression and eventually death. Where the exposure is less severe, the first symptoms may be blurring of vision, photophobia and conjunctivitis, followed by the development of definite eye lesions. Headache, gastrointestinal disturbances, dizziness, and a feeling of intoxication may also be experienced. The visual symptoms may clear temporarily, only to recur later and progress to blindness.

Another constituent of many paint removers is benzene. Its toxicity is only moderate for a single exposure. However, it induces severe chronic toxic effects, causing anemia and damage to the bone marrow. Ultimately, it can cause death.

Acetone is among numerous other chemicals which have been used in chemical paint removers. Acetone has low toxicity but has such a high vapor pressure that it, like methylene chloride, does not stay on the surface long enough to cut through multiple layers of paint. It also presents a fire hazard. It is therefore not suitable as a basis for a paint removing composition.

Other types of paint removers have been suggested. For example. U.S. Pat. No. 3,702,304 discloses use of oil-in-water emulsions containing xylene and either dimethyl formamide, dimethyl acetamide, or dichloromethane. U.S. Pat. No. 3,355,385 shows a number of mixtures which all contain hydrogen peroxide. Hydrogen peroxide is a powerful oxidizing agent which is therefore too hazardous for common household use because it attacks the skin and eyes. Phenol and cresols also are also mentioned, but these are too toxic for safe use in non-industrial paint removers. Likewise suffering from the disadvantage of high toxicity is a paint remover containing methylene chloride and n-methyl 2-pyrrolidone, suggested in *Methyl Pyrrolidone*, Antara Chemicals (Division of GAF Corporation), 1961, pages 24–26.

*M-Pyrol Handbook*, GAF Corporation, 1972, page 52, suggests a paint remover consisting of thickened N-methyl 2-pyrrolidone (hereinafter referred to as "NMP"). Currently, NMP costs over four times as much as methylene chloride and ten times as much as other common paint remover constituents. The high cost of NMP significantly increases the cost of the paint remover.

U.S. Pat. No. 4,120,810 relates to mixtures of NMP and blends of alkyl naphthalenes and alkyl benzenes having molar volumes greater than or equal to about 140 cc/g. Mixtures of this type are alleged to exhibit paint removal properties equal to NMP itself while having reduced cost. However, due to the cost of NMP, these mixtures still presently cost far more than paint stripping compositions currently in widespread commercial use. While alternate technologies have been proposed, none promise to significantly reduce the cost of production of NMP, and make it cost competitive with methylene chloride.

Accordingly, an object of this invention is to provide improved paint removers which have reduced toxicity.

Another object is to provide an improved paint remover which does not burn the skin and which has reduced volatility.

A further object is an improved paint remover that is safe, effective, and of a reasonable cost.

SUMMARY OF THE INVENTION

This invention relates to paint removing compositions comprising lower alkyl-substituted 2-oxazolidinones.

This invention also relates to methods of softening and/or removing paint through the application of the above compositions to a painted substrate.

DETAILED DESCRIPTION OF THE INVENTION

Lower alkyl-substituted 2-oxazolidinones are important polar solvents and are widely used as intermediates in and media for organic synthetic reactions. They are also used as solvents for polymeric compounds and as solvents for the extraction of aromatic hydrocarbons and unsaturated hydrocarbons in petroleum refining.

The term "lower alkyl-substituted 2-oxazolidinones" as used herein means 3-alkyl-substituted 2-oxazolidinones, 4-alkyl-substituted 2-oxazolidinones, 5-alkyl-substituted 2-oxazolidinones and mixtures thereof wherein the alkyl group contains from 1 to about 8 carbon atoms. Preferably, 3-alkyl-substituted 2-oxazolidinones wherein the alkyl group contains from 1 to about 6 carbon atoms are used in the practice of the present invention. Most preferably, 3-methyl-2-oxazolidinone is used in the practice of the present invention.

Methods for the production of lower alkyl-substituted 2-oxazolidinones are disclosed in U.S. Pat. No. 2,399,188 and by M. E. Dyen and D. Swern in *Chem. Rev.*, 67, 197 (1967). The production of the compound which is most preferably used in the practice of the present invention, namely 3-methyl-2-oxazolidinone is disclosed in Japanese Published Application No. 60/97967 and by H. L. Hoffman, Jr. et al in *Jour. Soln. Chem.*, 1, 187 (1972).

While lower alkyl-substituted 2-oxazolidinones are found to be an excellent paint removers when used alone, they may also be used in conjunction with other materials without exhibiting an unacceptable loss of paint removing ability. For instance, lower alkyl-substituted 2-oxazolidinones may be used in conjunction with other known paint removers, such as diacetone alcohol, NMP, butyrolactone, chemical analogs of NMP, especially its chemical homolog N-vinyl 2-pyrrolidone, toluene and xylene and mixtures thereof.

Mixtures containing lower alkyl-substituted 2-oxazolidinones may also be formed with highly aromatic blends of hydrocarbons sometimes referred to as "heavy aromatic naphthas". Such a blend is sold by Amoco Chemicals under the trade name Panasol AN-1. An equivalent mixture is sold by Ashland Chemical under the trade name HYSOL 4-1. These blends contain 99.2 volume percent aromatics, have a specific gravity of about 0.9593, a molar volume of about 146 cc/g mole and have a flash point of about 165° F. They are primarily mixtures of alkyl benzenes and alkyl naphthalenes. Other attractive aromatic hydrocarbon fractions are identified by the trade names Panasol AN-2, AN-3, and RX-22. There are other aromatic hydrocarbons which could be used in forming mixtures within the scope of the present invention, however the use of higher molecular weight hydrocarbons lowers the evaporation rate and raises the flash point of the mixture, both desirable characteristics for paint removers.

Compounds such as methylene chloride and benzene may also be used in conjunction with lower alkyl substituted 2-oxazolidinones. However, due to their toxicity, the presence of these compounds should be minimized and preferably avoided.

If lower alkyl-substituted 2-oxazolidinones are admixed with other materials such as those exemplified above, it is preferred that they be present in concentrations of about 20 to about 80 weight percent, based upon the total weight of the paint removing composition. More preferably, they should be present in concentrations of about 40 to about 80 weight percent, based upon the total weight of the paint removing composition.

Optionally, additives may also be present. High flash point polar solvents such as the glycol ethers, carbitol being preferred, may be added in quantities up to about 25 volume percent. Other materials may also be present but are less desirable because of their toxicity, cost, odor, or volatility, are: ethanol, isopropanol, n-propanol, ketones having from three to seven carbon atoms, and diketones having from four to eight carbon atoms, excluding those having melting points above 70° F. Acetophenone can likewise be used. Water should not be used. Chemicals which are damaging to the skin should also be minimized.

The paint removing compositions are advantageously thickened. It is known that good thickening of paint removing compositions can be obtained with from one to three weight percent of hydroxypropyl cellulose, or with from two to six weight percent ethylcellulose. The use of other thickeners will be apparent to one skilled in the art.

To enhance the water washability of the paint remover, particularly when the thickener is not water soluble, it is advantageous to employ surfactants. An example of the type of surfactant which can advantageously be used in conjunction with an ethyl cellulose thickener is polyoxyethylene tridecyl ether. The use of other similar surfactants capable of creating oil-in-water emulsions is also well known in the art.

The time necessary for the paint remover compositions of the present invention to soften a paint sufficiently to allow for its removal will depend upon the exact composition of the paint remover composition. Visual inspection of the painted substrate and prodding of the painted surface with a tool such as a putty knife gives perhaps the best indication of when the paint is ready for removal. Once the paint has been softened sufficiently, it may then be removed from the substrate with a putty knife or rag.

Whereas the exact scope of the instant invention is set forth in the appended claims, the following specific examples are provided to further illustrate certain aspect of the present invention. These examples are set forth for illustration only and are not to be construed as limitations on the present invention. All parts and percentages are by weight unless otherwise specified.

EXAMPLES

A pine wood surface was painted with an alkyd primer paint which was allowed to dry. To the wood surface was then applied an alkyd industrial enamel containing 8.2% pigment, 40.0% vehicle and driers and 51.8% solvent paint. The paint was then allowed to dry.

Three (3) drops of each test solvent was then placed onto the painted surface and covered with a small plastic cup to minimize solvent loss. At the end of the time periods specified below, the effectiveness of the solvents as paint removers was determined by visual observation. The results appear below.

| Example | Composition | Observations |
|---|---|---|
| 1 | methylene chloride | 10 minutes - paint lifted |
| | | 20 minutes - paint dissolved |
| | | 30 minutes - paint dissolved |
| 2 | 3-methyl-2-Oxazolidinone | 10 minutes - paint lifted |
| | | 20 minutes - paint dissolved |
| | | 30 minutes - paint dissolved |
| 3 | ethyl 3-ethoxy propionate | 10 minutes - no effect |
| | | 20 minutes - no effect |
| | | 30 minutes - paint slightly softened |
| 4 | diisobutyl ketone | 10 minutes - no effect |
| | | 20 minutes - no effect |
| | | 30 minutes - no effect |
| 5 | 1-methyl-2-propyl-acetate | 10 minutes - no effect |
| | | 20 minutes - no effect |
| | | 30 minutes - no effect |
| 6 | 50/50 3-methyl-2-oxazolidinone + xylene | 10 minutes - paint dissolved |
| | | 20 minutes - paint dissolved |
| | | 30 minutes - paint dissolved |
| 7 | Isophorone | 10 minutes - paint softened |
| | | 20 minutes - paint dissolved |
| | | 30 minutes - paint dissolved |

As shown by the preceding Examples, 3-methyl-2-oxazolidone alone and in combination with other compounds (see Example 6), removed paint from the wood surface at a rate comparable to that exhibited by methylene chloride.

We claim:

1. A method for removing paint from a substrate to which it has been applied comprising
    (a) contacting said paint with a paint remover composition comprising from about 20 to about 80 weight percent, based upon the total weight of the paint remover composition of at least one lower alkyl substituted 2-oxazolidinone; and
    (b) removing said paint from said substrate.

2. The method of claim 1 wherein the lower alkyl-substituted 2-oxazolidinone is present in concentrations of about 40 to about 80 weight percent, based upon the total weight of the paint remover composition.

3. The method of claim 1 wherein the lower alkyl-substituted 2-oxazolidinone selected from the group consisting of 3-alkyl substituted 2-oxazolidinones, 4-alkyl substituted 2- oxazolidinones, 5-alkyl substituted 2-oxazolidinones and mixtures thereof.

4. The method of claim 3 wherein the alkyl groups of the 3-alkyl substituted 2-oxazolidinones, 4-alkyl-substituted 2-oxazolidinones, or 5-alkyl-substituted 2-oxazolidinones contain from 1 to about 4 carbon atoms.

5. The method of claim 1 wherein the lower alkyl-substituted 2-oxazolidinone is 3-methyl 2-oxazolidinone.

6. The method of claim 1 wherein the paint remover composition further comprises a compound selected from the group consisting of diacetone alcohol, N-methyl 2-pyrolidone butyrolactone, n-vinyl 2-pyrrolidone, toluene and xylene.

7. The method of claim 1 wherein the paint remover composition further comprises a blend of heavy aromatic naphthas.

8. The method of claim 1 wherein the paint remover composition further comprises a thickener.

9. The method of claim 8 wherein the thickener is selected from the group consisting of hydroxypropyl cellulose and ethylcellulose.

10. A method for softening paint which has been applied to a substrate comprising contacting said paint with a paint remover composition comprising from about 20 to about 80 weight percent, based upon the total weight of the paint remover composition of at least one lower alkyl substituted 2-oxazolidinone.

11. The method of claim 10 wherein the lower alkyl-substituted 2-oxazolidinone is present in concentrations of about 40 to about 80 weight percent, based upon the total weight of the paint remover composition.

12. The method of claim 10 wherein the lower alkyl-substituted 2-oxazolidinone selected from the group consisting of 3-alkyl-substituted 2-oxazolidinones, 4-alkyl-substituted 2-oxazolidinones, 5-alkyl-substituted 2-oxazolidinones and mixtures thereof.

13. The method of claim 10 wherein the alkyl groups of the 3-alkyl-substituted 2-oxazolidinones, 4-alkyl-substituted 2-oxazolidinones, 5-alkyl-substituted 2-oxazolidinones contain from 1 to about 4 carbon atoms.

14. The method of claim 10 wherein the lower alkyl-substituted 2-oxazolidinone is 3-methyl-2-oxazolidinone.

15. The method claim 14 wherein 3-methyl-2-oxazolidinone is present in the paint remover composition in concentrations of about 20 to about 80 weight percent, based upon the total weight of the paint remover composition.

16. The method claim 15 wherein 3-methyl-2-oxazolidinone is present in the paint remover composition in concentrations of about 40 to about 60 weight percent, based upon the total weight of the paint remover composition.

* * * * *